United States Patent Office 2,962,299
Patented Nov. 29, 1960

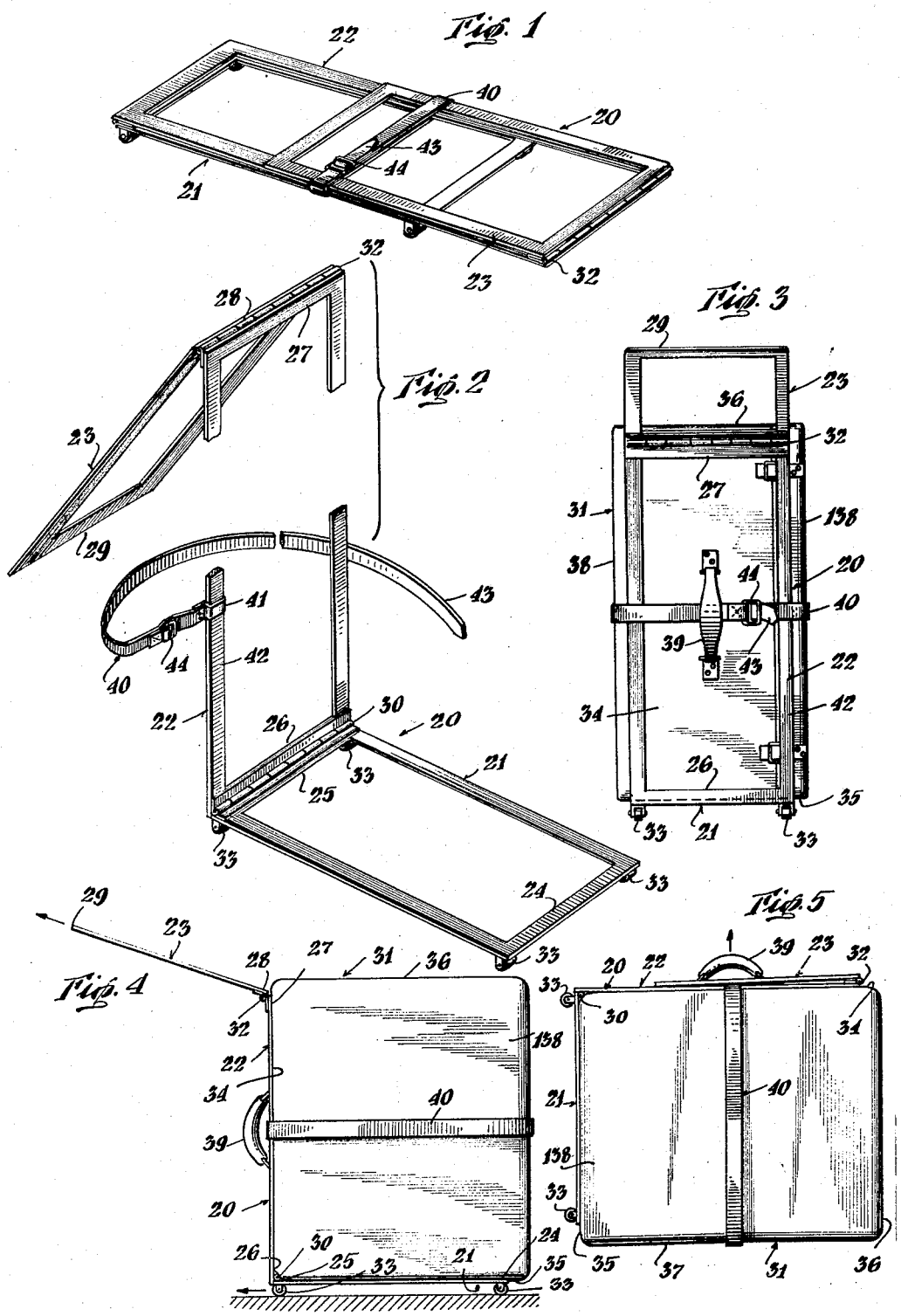

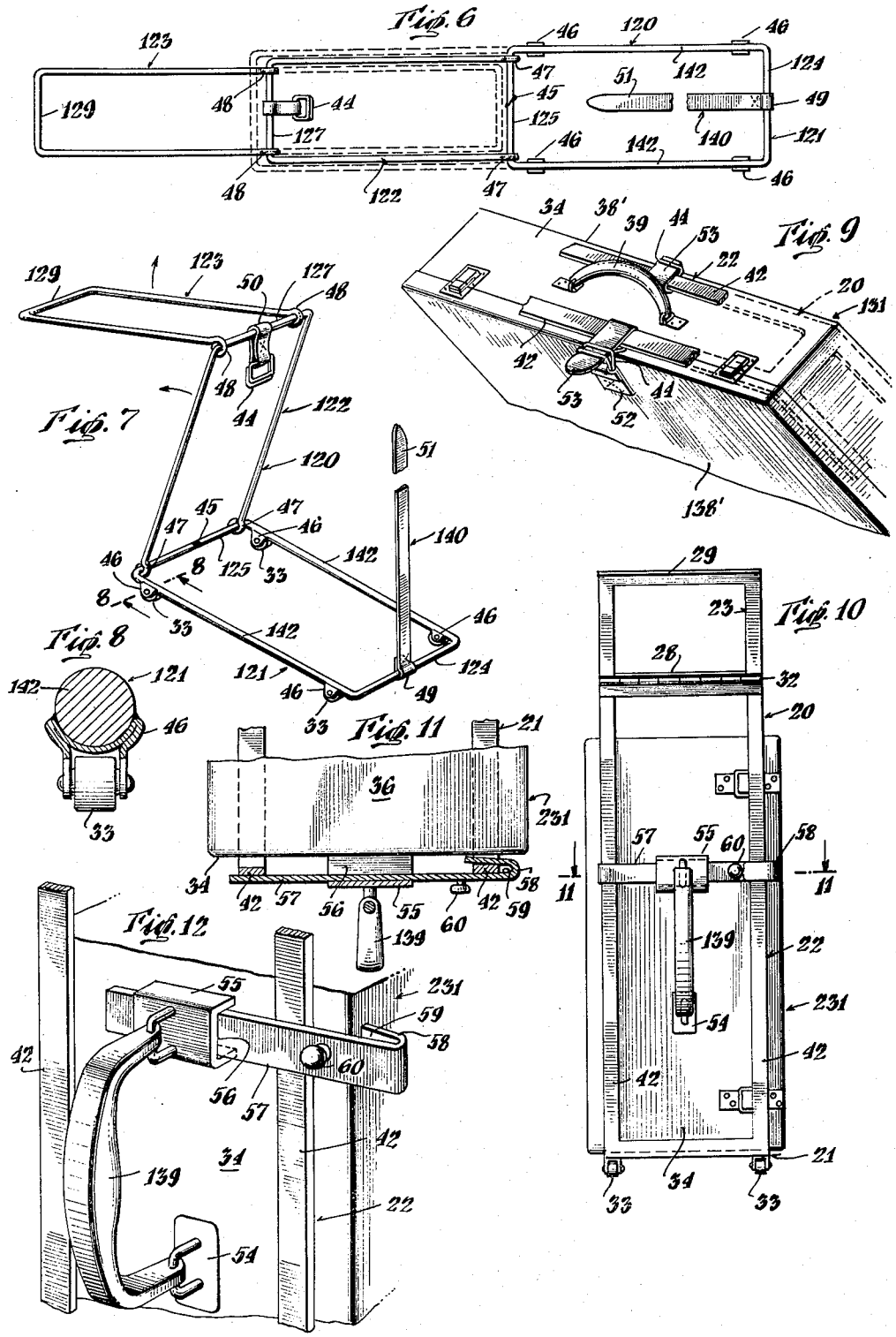

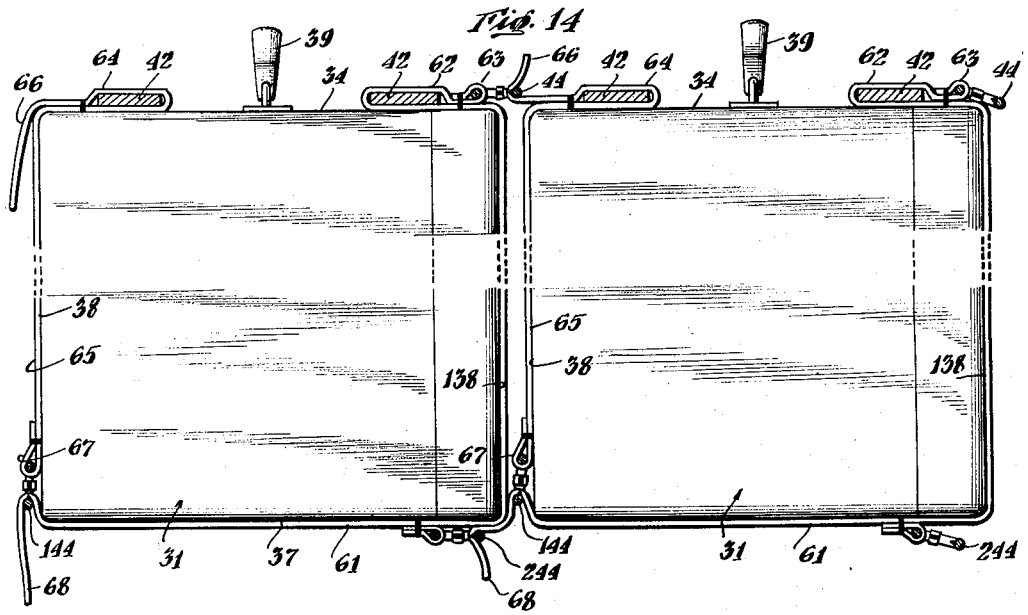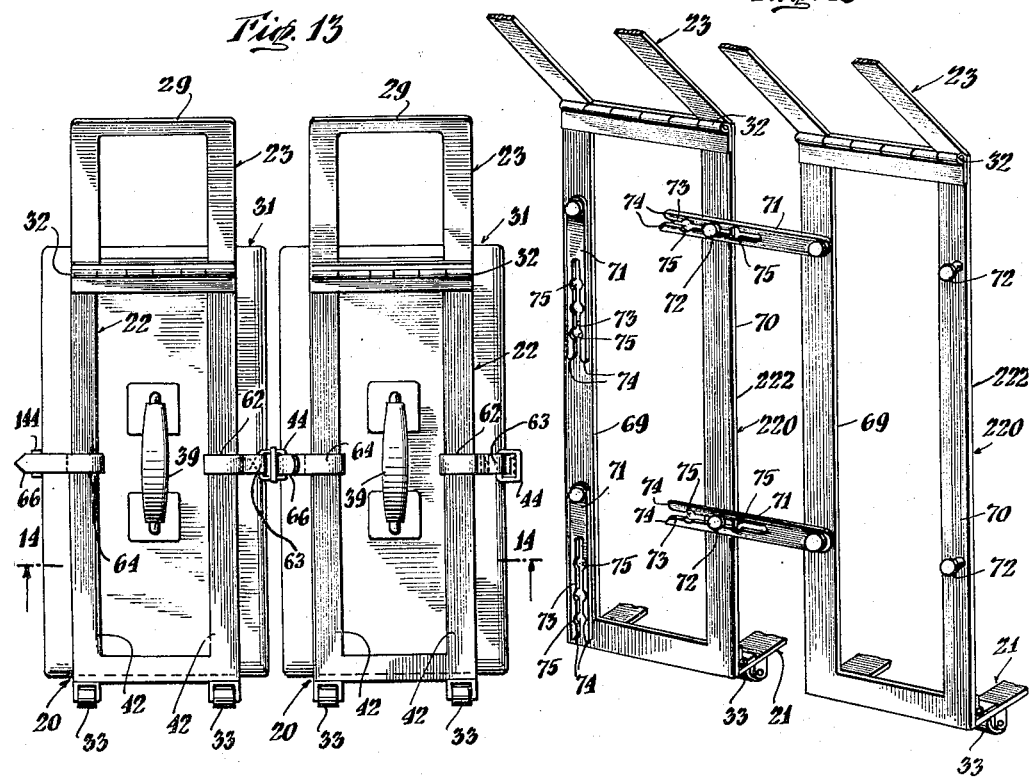

2,962,299

LUGGAGE CARRIAGE

Mildred Carey Dawkins, 137 E. 28th St., New York 16, and Colin Campbell Dawkins, II, 800 Bronx River Road, Bronxville, N.Y.

Filed June 17, 1954, Ser. No. 437,382

10 Claims. (Cl. 280—179)

The present invention relates to wheeled luggage carriages of the type adapted temporarily to be mounted on pieces of luggage, such as suitcases, trunks, and the like, to facilitate their transportation.

A general object of the present invention is to provide such a luggage carriage which is readily and economically constructed and easily assembled, is of light weight and compact in form while being readily collapsible or foldable to permit desirable ready storage; such apparatus being readily attached to any of various shapes and sizes of different types of luggage pieces, e.g., suitcases, pullman cases, trunks, etc., to remain thereon throughout a trip without undue interference with manual transport or storage of the luggage piece in racks and the like while permitting easy rolling transport when desired.

A more specific object of the invention is to provide such carriage in the form of a wheeled base section effectively to support one end of a luggage piece, a back section to be detachably mounted to the top panel of such luggage piece and a handle section, hinged one to the other in the order of their recitation, such carriage thereby permitting continuance of mount on the top of the luggage piece throughout a trip without undue interference with usual manual handling of the luggage piece, the former being carried by the latter, while constantly providing a wheeled undercarriage mounted to the luggage piece for instant positioning below one end of the latter when wheeled transport is desired, the handle section efficiently serving to permit ready grasping thereof and easy manipulation of the carriage in wheeled transportation of the luggage piece when the latter is supported by the former.

A further object of the invention is to provide structural embodiments of which a plurality, when loaded, may be readily connected together, side-by-side, to be wheeled together for simplifying simultaneous transportation of the luggage pieces equipped therewith.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

Fig. 1 is a perspective view of an embodiment of the luggage carriage of the present invention as collapsed or folded to facilitate handling and marketing prior to use;

Fig. 2 is a perspective view, with parts broken away, of the structure shown in Fig. 1, when unfolded for mounting upon or to a luggage piece;

Fig. 3 is an end elevation of the carriage structure depicted in Figs. 1 and 2, and a suitcase to which it is demountably fastened, showing the suitcase being supported and wheeled thereby;

Fig. 4 is a side elevational view, to smaller scale, of the structure shown in Fig. 3;

Fig. 5 is a side elevation of the structure shown in Fig. 4 with the suitcase being turned upright for manual transport with the carriage supported thereon;

Fig. 6 is a plan view of another embodiment of the invention in laid-out or unfolded condition, indicating in dotted lines the relative positions of parts when folded together;

Fig. 7 is a perspective view of the structure shown in Fig. 6, showing the relative position of parts as they are being manipulated to receive a luggage piece thereon;

Fig. 8 is an enlarged detailed section taken substantially on line 8—8 of Fig. 7;

Fig. 9 is a perspective view, with parts broken away, of a modified form of fastening means as employed to mount a carriage of the Figs. 1–5 inclusive type upon a specially designed suitcase;

Fig. 10 is an end elevation similar to Fig. 3 showing a further embodiment of the carriage as modified with respect to the fastening means;

Fig. 11 is an enlarged section, with parts broken away, taken substantially on line 11—11 of Fig. 10;

Fig. 12 is an elevational perspective, with parts broken away, of the structure shown in Fig. 11;

Fig. 13 is an end elevation of two suitcases each equipped with still another form of the carriage of the present invention and connected or tied together, side-by-side, for unitary handling;

Fig. 14 is an enlarged section, with parts broken away, taken substantially on line 14—14 of Fig. 13; and Fig. 15 is an elevational perspective, with parts broken away, of two carriages tied together by another form of connecting means.

Referring to the drawings, in which like numerals identify similar parts throughout, it will be seen from Figs. 1 to 5 inclusive that an embodiment of the foldable luggage carriage of the present invention, as illustrated at 20, may comprise a substantially rigid base section 21, a substantially rigid back section 22, and a substantially rigid handle section 23, successively hinged together with the back section interposed between the base section and the handle section. In the embodiment illustrated in Figs. 1 to 5 inclusive, the three sections 21, 22 and 23 are of appreciable width and preferably each is of open frame construction and are substantially rectangular in plan view, as shown. The base section 21 has opposed ends 24 and 25; the back section has opposed ends 26 and 27; and the handle section has opposed ends 28 and 29. The end 25 of base section 21 is hingedly connected to the end 26 of back section 22 by any suitable free-swinging unlockable hinge connection 30 which permits the back section to be swung down to, for collapse substantially upon, the base section, as illustrated in Fig. 1, while allowing it to be swung up relative to the latter at least substantially at right angles thereto, as illustrated in Fig. 2. It is not necessary that the hinge means 30 allow the back section 22 to be swung up relative to the base section 21 through more than 90° as they are to accommodate therebetween, in mounted or nested position, a rectangular piece of luggage, such as that illustrated at 31. The end 27 of back section 22 is hingedly connected to end 28 of handle section 23 by any suitable means, such as free-swinging unlockable hinge structure 32, which permits the handle section to be folded back down and collapsed upon the back section 22, so that the three sections are folded together in zigzag fashion as illustrated in Fig. 1. Alternatively hinge 32 permits handle section 23 to be swung up, as illustrated in Fig. 2, preferably to a position appreciably beyond 90° so as to extend obliquely therefrom for convenience of grasping by one's hands the free end 29 which forms a transversely-extending hand grasp cross bar, and to permit easy manipulation of the loaded carriage, as will be understood from Fig. 4. The rigid handle section 23 thus forms a loop handle structure, hingedly connected to the back section 22. Each of the hinge structures at 30 and 32 has transversely-extending pintle means carried by one of the sections and a plurality of transversely-spaced eye means carried by the next adjacent section with the eye means freely receiving the pintle means therethrough.

Since the rigid base section 21 is to serve as an undercarriage for wheeled transportation of a piece of luggage when supported thereon, it is provided with any suitable relatively small wheel or roller means wholly mounted on and extending below it, such as rollers 33—33, preferably mounted to the underside thereof at its four corners by any suitable bifurcated clips or forks and axle pins well known in the art. The top side of the base section is free of upwardly projecting structure so as not to interfere with proper seating thereon of a panel of the luggage piece. Regardless of the type of piece of luggage upon which the foldable luggage carriage of the present invention is to be demountably fastened alternatively to be carried thereon and for wheeled transportation thereof, the back section 22 is to be mounted on the top of the luggage piece. For example, the luggage piece 31 may be of the suitcase type, as illustrated in Figs. 3, 4 and 5, which is substantially rectangular in shape, having a top panel 34, opposite end panels 35 and 36, bottom panel 37, and opposite side panels 38 and 138, the latter constituting the closing top when the piece is rested on the opposite side 38. The luggage piece 31, being of the suitcase type, has a conventional loop handle 39 mounted centrally to the top panel 34. The luggage piece 31 is to be nested into the angle between the roller-equipped base section 21 and the unfolded upwardly-extending back section 22 with the luggage end panel 35 seated upon the base section and with the luggage top panel 34 demountably fastened to the back section 22.

For this purpose of demountable fastening, the back section 22 may be provided with suitable harness in the form of flexible tying means 40, which may be provided as a flexible strap of webbing having one end suitably attached at 41 to one side member 42 of the back section, and with the free end 43 of the strap being adapted to be lapped back across the back section and about the luggage piece, first across the top panel 34, then down one side panel 138, across the bottom panel 37, and finally up the other side panel 38 with its free end 43 tightened through suitable buckle means 44 carried by the strap near its anchorage at 41. It will be understood from Figs. 3, 4 and 5 that the strap 40 securely fastens, in a demountable manner, the carriage back section 22 to or upon the top panel 34 of the luggage piece 31, and the formation of the back section as an open frame construction, which is centrally free of structure, permits the free projection therethrough of the conventional handle 39, so that it will be freely accessible to one's hand for manual transportation of the suitcase with the carriage mounted thereon, as indicated in Fig. 5. Also, the tying means or strap 40 may be employed, if desired, to hold the three sections of the luggage carriage 20 in collapsed and relatively zigzag folded positions, as illustrated in Fig. 1, which permits distribution and marketing thereof in a compact form.

In operation of the embodiment illustrated in Figs. 1 to 5 inclusive, a traveler may purchase the device in the folded and collapsed condition illustrated in Fig. 1 and prepare it for use during a trip by unfastening the strap 40 and swinging the back section 22 up substantially normal to the base section 21, as illustrated in Fig. 2. He may then place a luggage piece, such as suitcase 31, upon the luggage carriage 20 in the manner illustrated in Figs. 3 and 4; or he mounts the luggage carried upon the luggage piece in the manner illustrated in Fig. 5. In either event, he then laps the strap 40 about the luggage piece and buckles it down temporarily to fasten the carriage back section 22 upon or to the luggage piece top panel 34. Then, during the trip, the suitcase 31 may be manually transported in the usual manner by means of its handle 39 as indicated by the arrow in Fig. 5, without the luggage carriage, as mounted thereon in the illustrated manner, interfering in any way with such manual transportation. Also, the luggage carriage 20, when so mounted on the luggage piece 31, does not in any way interfere with other normal handling procedures, such as storage of the suitcase in luggage racks, etc. It is not necessary that the base section 21 be securely fastened to the end panel 35 of the luggage piece 31, since when the latter is standing upright in the position of Fig. 5, the base section will hang dependent from its hinge 30 down along the end panel 35; also, if hinge 30 be of the type limiting swing to no more than about 90°, it likewise will restrain the base section from swinging out away from this luggage end panel.

With the luggage piece 31 equipped with the foldable luggage carriage 20 of the Figs. 1 to 5 inclusive embodiment, the traveler may, during a trip, employ the carriage for wheeled transportation of the luggage piece through terminals, etc., by tipping the luggage piece up on its end 35 so that it rests upon the roller-equipped base section 21, as illustrated in Figs. 3 and 4. The traveler then swings the handle section 23 upwardly away from the back section 22, such as to the oblique position illustrated in Figs. 3 and 4, and by grasping the cross bar 29, wheels the carriage and the luggage piece supported thereon by pushing, or by dragging the carriage as suggested by the arrows in Fig. 4.

It will be understood that the luggage carriage of the present invention is also equally adapted for mounting upon and transportation of other types of pieces of luggage, such as small trunks, etc. For example, the luggage carriage embodiment illustrated in Figs. 1 to 5 inclusive may be mounted upon a small trunk of the type which is fitted with looped handles on the opposite end panels. In such case, the looped handle on one end panel will extend through the open framework of the base section 21 when rested on the latter, but without interfering with free wheeled transportation, and back section 22 will be strapped upon the top of the trunk in a manner similar to that described above. Such luggage carriage 20 may remain so mounted upon the trunk during the entire trip alternately to be carried thereon without unduly interfering with operations when it is desired manually to handle the trunk by means of the loop handles on its opposite ends and to permit wheeled transportation of the trunk by the carriage when the trunk is unpended upon the carriage base section 21.

As proposed in Figs. 6, 7 and 8, the foldable luggage carriage of the present invention may be provided in a simplified form illustrated at 120, wherein it is indicated that base section 121 may be in the form of a rectangular open frame structure formed of round stock or heavy wire, which when bent into the shape of a continuous rectangular loop, may have its ends suitably fastened together, such as by brazing or welding, as indicated at 45. The rectangular base section 121 may be suitably equipped wholly on its bottom side with rollers 33—33 in the manner proposed in Fig. 8, such as by providing the side members 142, 142 thereof each with suitably shaped clips 46, 46 welded or brazed thereto, and with each of the latter rotatably supporting one of the rollers 33, and its top side is free of upwardly projecting structure as shown. Back section 122 of the carriage 120 preferably is in the form of a U-shaped loop of similar wire stock having a transversely-extending mid-portion 127 and its two ends 47, 47 bent to form transversely-spaced eyes through which the transversely-extending end member 125 of the base section 121 is engaged as pintle means for relative rotation, and to provide the free-swinging unlockable hinge connection equivalent to that provided at 30 in the Figs. 1 to 5 inclusive embodiment. The handle section 123 is also preferably provided in the form of a U-shaped loop which may be made from the same wire stock having its ends 48, 48 also bent into transversely-spaced eyes rotatably receiving therethrough the transversely-extending end 127 of the back section 122 as pintle means, to provide a hinge connection therebetween the equivalent of that illustrated at 32 in the Figs. 1 to 5 inclusive embodiment. Transversely-extending end member 129 of the loop handle section 123 forms the hand grasp cross bar.

The Figs. 6, 7 and 8 embodiment illustrates that the means for temporarily and demountably fastening the luggage carriage of the present invention, such as the embodiment illustrated at 120, need not be a strap to lap transversely about the luggage piece, as proposed in Figs. 1 to 5 inclusive. For example, such fastening means may be in the form of a flexible strap of webbing 140 having one of its ends fastened at 49 about the transversely-extending end member 124 of the base section 121. Cooperating buckle 44 may be connected to the transversely-extending end member 127 of the back section 122 by a strap loop 50. Thus, when the foldable luggage carriage 120 is mounted to a luggage piece, such as a suitcase, by juxtaposing its back section 122 to the top panel of the latter and with the base section 121 lying along one end panel of the suitcase, the strap 140 may be brought up along the bottom panel of the suitcase and then over the other end panel, and finally down along the top panel to the buckle 44 where the free end 51 of the strap will be temporarily engaged in the buckle and the strap tightened up longitudinally about the luggage piece. Thus, the disengageable fastening means in the Figs. 1 to 5 inclusive embodiment is in the form of a flexible strap 40 adapted to extend entirely transversely about the luggage piece, while in the Figs. 6, 7 and 8 embodiment, such fastening means is in the form of strap 140, which laps only partially about the luggage piece in a longitudinal direction.

As proposed in Fig. 9, the disengageable fastening means may be of a type employing certain features of specially-designed luggage. For example, as there illustrated, suitcase 131 may have mounted to each of its opposite side panels 38', 138' buckle anchoring means 52 which fastens thereto any suitable strap buckle, such as 44. In this event, the side members 42, 42 of the back section 22 of the luggage carriage 20 will each have fastened thereto a short length of strap 53 with one strap being detachably engageable by buckle 44 mounted to one side panel 38' of the luggage and the other length of strap detachably engageable by the other buckle 44 mounted to the opposite luggage side panel 138'. As a result, the back section 22 of the luggage carriage will be demountably fastened to and upon top panel 34 of the luggage piece 131.

As proposed in Figs. 10, 11 and 12, the luggage piece may be modified in another manner to provide a different type of disengageable fastening means. For example, the luggage piece, as illustrated at 231, may be in the form of a suitcase having its top panel 34 equipped with a special loop handle 139 connected thereto at one end in a conventional manner as illustrated at 54 and at the other end by a special transversely-extending bridge element 55 which provides a transversely extending way or tunnel 56 through which a special clip 57 may be passed. The clip 57 may be in the form of an elongated metallic bar of sufficient length to bridge across to the outer sides of the side members 42, 42 of the carriage back section 22 to clamp it in position adjacent to the luggage top panel 34, as will be best understood from Fig. 11. The clip 57 may be temporarily held in clamping position by having one end reversed to provide a hook 58 providing a wedge-shaped or V-shaped notch 59 into which one of the side members 42 of the carriage back section 22 can be wedged when the clip 57 is forced laterally through the tunnel 56 to the bridging and clamping position shown in Fig. 11. If desired, the clip 57 may be provided with a suitable manual knob 60 to facilitate its manual manipulation and sliding to the bridging clamping position and from that position out of the handle anchorage tunnel 56 for freeing the luggage piece.

Foldable luggage carriages of the present invention may be so equipped as to permit a plurality thereof, such as two such carriages, to be temporarily connected together for simultaneous wheeled transportation of their respective luggage loads. For example, as illustrated in Figs. 13 and 14, two such luggage carriages 20, 20 of the Figs. 1 to 5 inclusive embodiment may be equipped with specially-designed harness or fastening means for demountably fastening the luggage pieces, such as suitcases 31, 31 thereto or thereon, and which may also serve as means for securely tying or connecting the loaded carriages together in side-to-side relation. For this purpose, one of the two side members 42 of the back section 22 may have fastened thereto a length of flexible strap 61 having one end 62 lapped about the side member and then reversed to provide an additional loop 63 through which is anchored buckle 44. The other side member 42 also has lapped about it one end 64 of a second length of flexible strap 65 with a relatively short length 66 hanging free, the other end providing a loop 67 through which is anchored another buckle 144, through which, in turn, is to engage end 68 of the strap 61.

Thus, the harness of the Figs. 13 and 14 embodiment of each carriage comprises two lengths of straps 61 and 65, respectively fastened to the opposite side members 42, 42 of the carriage back section 22, with one carrying buckle 144 and the other providing a strap end 68 to be engaged therein to permit tightening of the harness about the luggage piece 31 with the carriage back section securely tied to the top panel 34 of the luggage piece or suitcase. When it is desired temporarily to tie two such loaded carriages together in side-to-side relation, the short length of strap 66, which extends free from one of the side members 42, may be engaged in the buckle 44 connected to the adjacent side member 42 of the other carriage. The strap 61 is of sufficient length as to provide a free length beyond the buckle 144 and this free length of the end 68 is then drawn through an additional buckle 244 which is fastened to that portion of the strap 61 which is juxtaposed to the luggage bottom panel 37, preferably near the corner junction with side panel 38, as illustrated in Fig. 14. Thus, the free, relatively short length 66 of strap adjacent the top panel 34 of one suitcase 31 is engaged in the buckle 44 on the strap about the second suitcase, and the end 68 of the strap 61 about the first suitcase is engaged in the buckle 244 of the second suitcase strap, so that when those free strap ends are tightened through those buckles, the two suitcases will be snugly tied together and, as a result, the carriages are temporarily connected in side-to-side relation.

As indicated in Fig. 15, such temporary connection in side-to-side relation of the two carriages may be effected by rigid disconnectable fasteners which are mounted directly to the carriages themselves. For example, carriages 220, 220 may each be similar to the carriage 20 of the Figs. 1 to 5 inclusive embodiment, but the back section 222 of each has side members 69 and 70 thereof respectively carrying the pivotally mounted catch means 71, 71 and anchoring means or buttons 72, 72. Each catch means 71 may be in the form of an elongated strap which is slotted longitudinally at 73 to form a bifurcated end and define parallel elongated fingers 74, 74, the slot being provided at intervals with pairs of opposed notches 75—75 to form localized enlargements of the slot. Each button 72 preferably is in the form of a knob having a reduced neck which is of a diameter greater than the width of slot 73, except at the pairs of opposed notches 75—75. Thus, when one of the pivoted straps 71 is moved longitudinally so as to receive in the slot 73 therein the neck of one of the buttons 72, the fingers 74 and 74 provided by the bifurcation will be sprung apart until the button neck reaches the enlargement provided by one of the opposed pair of notches 75, 75, so as there snugly to grip the button and effect temporary engagement. Each bifurcated catch 71 is provided with a plurality of the pairs of the opposed notches 75, 75 so as to permit adjustment of the space between the adjacent carriages, which will be dictated by variations in the thickness of the luggage pieces mounted on the carriages.

When one is transporting a plurality, e.g. two, of luggage pieces equipped with foldable luggage carriages of the present invention, such as those proposed in Fig. 15, the traveler, when he desires simultaneous wheeled transportation, will move the loaded carriages 220, 220 or the luggage pieces on which they are mounted to side-by-side relation and swing the bifurcated catch straps 71, 71 on one carriage out to the side to extend toward the buttons 72, 72 on the adjacent carriage. He will then guide the buttons 72, 72 of the adjacent carriage into the slots 73, 73 of the bifurcated catch straps 71, 71 and move the loaded carriages toward each other to slide the buttons in the strap slots until the loaded carriages, and/or their loads, are brought close together with snap of the button necks in such notched enlargements as are most conveniently located for those particular relative positions of the loaded carriages. Of course, disengagement of the loaded carriages is simple by merely lateral separation thereof, which snaps and slides the necked buttons 72, 72 longitudinally out of the slots 73, 73.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described our invention, what we claim as new and desire to secure by Letters Patent is:

1. A folded, relatively flat, three-section luggage carriage structure for demountably fastening on and to be carried by a manually carried piece of generally rectanangular luggage of the type having generally rectangular top, bottom, a pair of opposed side and a pair of opposed end panels; comprising, in combination; relatively rigid substantially flat base, back and handle sections of relatively little space-occupying thickness and appreciable width successively connected together in that order and with each having opposite ends, at least said back and handle sections being centrally free of structure to permit projection therethrogh of a luggage handle with said handle section having a free end provided with hand grasping means; said three sections being folded together in zigzag fashion and juxtaposed relation with said back section intervening the other two sections; relatively small roller means mounted wholly on the outer side of said base section in the general vicinities of both ends thereof and extending away therefrom for sole stabilized roller support thereof with the inward opposite side of said base section being free of projecting structure and constituting the top thereof adapted to support an end panel of such luggage piece when mounted thereon; free-swinging unlockable hinge means having transversely-extending pintle means carried by one of said base and back sections at one end thereof and a plurality of transversely-spaced eye means carried by the other of said base and back sections at one end thereof and freely receiving said pintle means therethrough, said hinge means being of the outward free swinging type having a swing arc from about 0° to at least 90°, such hinge structure permitting the other end of said back section to be swung up away from the top side of said base section to an upright position substantially normal to the latter for nesting therebetween such luggage piece; additional free-swinging unlockable hinge means at said other end of said back section hingedly connecting it to one end of said handle section with the other end of the latter being free, said additional hinge means having transversely-extending pintle means carried by one of said back and handle sections and a plurality of transversely-spaced eye means carried by the other of said back and handle sections and freely receiving said pintle means therethrough, said hinge means being of the outward free swinging type having a swing arc from about 0° to at least a point appreciably greater than 90°, such hinge structure permitting the free end of said handle section to be swung out away from said back section to a position extending back away from it for manual engagement of its hand grasping means when said back section is in its upright position; and disengageable fastening means for demountably fastening to the luggage piece top panel the inward front side of said back section when said base and back sections are unfolded to substantially normal positions relative to each other for transport of said carriage on the luggage piece.

2. The luggage carriage as defined in claim 1 characterized by said disengageable fastening means being strap means to extend across the two side and the bottom panels of the luggage piece intermediate the two end panels of the latter temporarily to tie said back section to the luggage piece top panel.

3. The luggage carriage as defined in claim 1 characterized by said fastening means being strap means cooperative parts of which are mounted on said base section and on said back section to form a loop of a length to extend longitudinally about the outside faces of the luggage piece when nested in the angle between said base section and the back section after the latter is swung normal to the former, temporarily to tie said back and base sections respectively to the top panel and one end panel of the luggage piece.

4. The luggage carriage structure as defined in claim 1 characterized by means temporarily to connect said back section of said carriage structure when loaded with such a piece of luggage to the back section of a like loaded carriage structure with both arranged alongside of each other.

5. The luggage carriage structure as defined in claim 4 characterized by said back sections connecting means being associated with said fastening means whereby when two such loaded carriage structures are positioned side by side said fastening and connecting means thereof cooperatively may serve temporarily to secure the loaded carriage structures together for simultaneous wheeled transportation.

6. The luggage carriage structure as defined in claim 5 characterized by said fastening means as comprising flexible strap means mounted to said back section to lap about the side panels and the bottom panel of such luggage piece, said strap means having said connecting means attached thereto disconnectably and rigidly to tie together the strap means of the two loaded carriage structures.

7. The luggage carriage structure as defined in claim 4 characterized by said connecting means as being rigid disconnectable fasteners mounted on said back section rigidly to so tie two such back sections together.

8. The luggage carriage structure as defined in claim 7 characterized by said disconnectable fasteners as comprising catch means pivotally mounted to one side of said back section and anchoring means for such catch means mounted to the other side of said back section whereby when the back sections of the plurality of such carriage structures are substantially aligned alongside each other said catch means of one may be disconnectably engaged to said anchoring means of the adjacent carriage structure.

9. A folded, relatively flat, three-section luggage carriage structure for demountably fastening on and to be carried by a manually carried piece of generally rectangular luggage of the type having generally rectangular top, bottom, a pair of opposed side and a pair of opposed end panels; comprising, in combination; three relatively rigid, substantially flat, open and substantially rectangular base, back and handle sections of relatively little space-occupying thickness and appreciable width successively connected together in that order and with each having opposite ends; said three sections being folded together in zigzag fashion and juxtaposed relation with said back section intervening the other two sections; relatively small roller means mounted wholly on the outer side of said base section in the general vicinities of both ends thereof and extending away therefrom for sole stabilized roller support thereof with the inward opposite side of said base section being free of projecting structure and constituting the top thereof adapted to support an end panel of such luggage piece when mounted thereon; free-swinging unlockable hinge means connecting one end of said base section to an adjacent end of said back section; said hinge means comprising a transverse end member of one of said base and back sections having at least two portions thereof at points spaced longitudinally of said member shaped cylindrically to provide a pair of pintle means at transversely-spaced points, and a pair of laterally-spaced eyes on the adjacent end of the other of said base and back sections with said eyes freely receiving therethrough said cylindrical pintle portions for articulative connection of said back and base sections permitting free relative swing through substantially 360° to allow said back section to be swung up away from the top side of said base section to an upright position substantially normal to the latter for nesting therebetween such luggage piece; additional free-swinging unlockable hinge means connecting the other end of said back section to one end of said handle section with the other end of the latter being defined by a transverse hand grasp bar; said additional hinge means comprising a transverse end member of one of said back and handle sections having at least two portions thereof at points spaced longitudinally of said member shaped cylindrically to provide another pair of pintle means at transversely-spaced points, and another pair of laterally-spaced eyes on the adjacent end of the other of said back and handle sections with said eyes freely receiving therethrough said cylindrical pintle portions for articulative connection of said back and handle sections permitting free relative swing through substantially 360° to allow said handle section to be swung out away from said back section to a position extending back away from it when said back section is in its upright position; and disengageable fastening means for demountably fastening to the luggage piece top panel the inward front side of said back section when said base and back sections are unfolded to substantially normal positions relative to each other.

10. A folded, relatively flat, three-section luggage carriage structure for demountably fastening on and to be carried by a manually carried piece of generally rectangular luggage; three relatively rigid, substantially flat, substantially rectangular open frame base, back and handle sections of appreciable width successively connected together end-to-end in that order; said three sections being folded together and nested in zigzag fashion and juxtaposed relation with said back section intervening the other two sections and with said base frame section being in the form of a rectangular closed loop having ends defined by rod-like transverse members; relatively small roller means mounted wholly on the outer side of said base frame section in the general vicinities of both ends thereof and extending away therefrom for sole stabilized roller support thereof with the inward opposite side of said base section being free of projecting structure and constituting the load-supporting top thereof; said back frame section being in the form of a U-shaped loop having a rod-like transverse member at one end with side members defining transversely-spaced legs terminating in a pair of eyes rotatively receiving one of said rod-like transverse end members of said base section freely therethrough for free relative swing through an arc of about 360°, said U-shaped back section frame being shorter and narrower than said base section closed loop and lying wholly within the latter in substantially the same plane; said handle frame section being in the form of another U-shaped loop having a transverse hand grasp end member and with its side members also defining transversely-spaced legs terminating in a pair of eyes rotatively receiving freely therethrough the rod-like transverse end member of said back section for free relative swing through an arc of about 360°, said U-shaped handle frame being shorter and narrower than said U-shaped back section frame and lying wholly within the latter in substantially the common plane of said back and base sections; and disengageable fastening means for demountably fastening to the luggage piece top panel the inward front side of said back section when said base and back sections are unfolded to substantially normal positions relative to each other.

References Cited in the file of this patent

UNITED STATES PATENTS

| | | |
|---|---|---|
| 639,338 | Barus | Dec. 19, 1899 |
| 1,099,933 | Pohrer | June 16, 1914 |
| 1,120,541 | Robinson | Dec. 8, 1914 |
| 1,715,865 | Rosenfeld | June 4, 1929 |
| 1,788,150 | Curtin | Jan. 6, 1931 |
| 2,229,244 | Husted | Jan. 21, 1941 |
| 2,344,272 | Sestan | Mar. 14, 1944 |
| 2,419,422 | Schulein | Apr. 22, 1947 |
| 2,650,105 | Costikyan | Aug. 25, 1953 |
| 2,670,969 | Costikyan | Mar. 2, 1954 |

FOREIGN PATENTS

| | | |
|---|---|---|
| 416,834 | France | Aug. 16, 1910 |